United States Patent
Lu (10) Patent No.: US 7,630,459 B2
(45) Date of Patent: Dec. 8, 2009

(54) FREQUENCY ACQUISITION AND TRACKING CIRCUIT

(75) Inventor: Mingho Lu, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 588 days.

(21) Appl. No.: 11/481,895

(22) Filed: Jul. 7, 2006

(65) Prior Publication Data
US 2007/0253513 A1 Nov. 1, 2007

(30) Foreign Application Priority Data
Apr. 26, 2006 (TW) .............................. 95114874 A (51) Int. Cl.
*H04L 27/00* (2006.01)
(52) U.S. Cl. ................... 375/326; 375/327; 375/340; 375/344
(58) Field of Classification Search ................. 375/326, 375/327, 340, 344
See application file for complete search history.

(56) References Cited

U.S. PATENT DOCUMENTS

| | | | | |
|---|---|---|---|---|
| 5,506,836 | A * | 4/1996 | Ikeda et al. | 370/203 |
| 5,579,338 | A * | 11/1996 | Kojima | 375/149 |
| 6,639,939 | B1 * | 10/2003 | Naden et al. | 375/140 |
| 6,983,134 | B1 * | 1/2006 | Asahara et al. | 455/182.2 |
| 7,200,188 | B2 * | 4/2007 | Fague et al. | 375/326 |
| 2004/0146122 | A1 | 7/2004 | Fague et al. | |

FOREIGN PATENT DOCUMENTS

| | | |
|---|---|---|
| CN | 1758639 A | 4/2006 |
| JP | 10-303997 A | 11/1998 |
| KR | 10-2004-0107607 A | 12/2004 |

OTHER PUBLICATIONS

Marvin K. Simon, IEEE Transactions on Communications, vol. com-26, No. 4, Apr. 1978, pp. 420-432.
Stephen Riter, IEEE Transactions on Aerospace and Electronics Systems, vol. Aes-5, No. 4, Jul. 1969, pp. 627-631.
Holly C. Osborne, IEEE Transactions on Communications, vol. Com-30, No. 10, Oct. 1982, pp. 2289-2296.

* cited by examiner

*Primary Examiner*—Jason M. Perilla
(74) *Attorney, Agent, or Firm*—Birch, Stewart, Kolasch & Birch, LLP (57) ABSTRACT

A frequency acquisition circuit for compensating a frequency offset of a received signal. A multiplier compensates the received signal according to a phase compensation signal to generate a first compensation signal, wherein the first compensation signal comprises a preamble and a plurality of symbols, and each of the symbols has a symbol length. A correlator generates a conjugate value according to symbols adjacent to the first compensation signal. A phase evaluator generates a phase angle through a COSTAS circuit according to a real part and an imaginary part of the conjugate value and generates a phase angle signal according to the phase angle and the symbol length. A phase accumulator for accumulating the phase angle signals of different symbols to generate an accumulated phase angle signal. An oscillator generates the phase compensation signal by looking up a table according to the accumulated phase angle signal.

27 Claims, 7 Drawing Sheets

FREQUENCY ACQUISITION AND TRACKING CIRCUIT

BACKGROUND OF THE INVENTION

1. Field of the Invention

The invention relates to frequency compensation circuit, and in particular relates to frequency acquisition and tracking circuit.

2. Description of the Related Art

OFDM (Orthogonal Frequency Division Multiplexing) is a very popular data transmission technique in recent years. OFDM technique is to divide an OFDM signal onto multiple sub-carriers that can be transmitted simultaneously. Although the sub-carriers are overlapped, one sub-carrier does not interfere with another sub-carrier due to their orthogonality.

The OFDM signal is sensitive to synchronization error, due to the narrow interval between sub-carriers. This synchronization error comprises a CFO (Carrier Frequency Offset) and an SFO (Sampling Frequency Offset). CFO is caused by the difference is the oscillation frequency, the Doppler effect and the phase noise between a transmitter and a receiver, and SFO is caused by the difference of the sampling frequency between the transmitter and the receiver.

Figure 1:
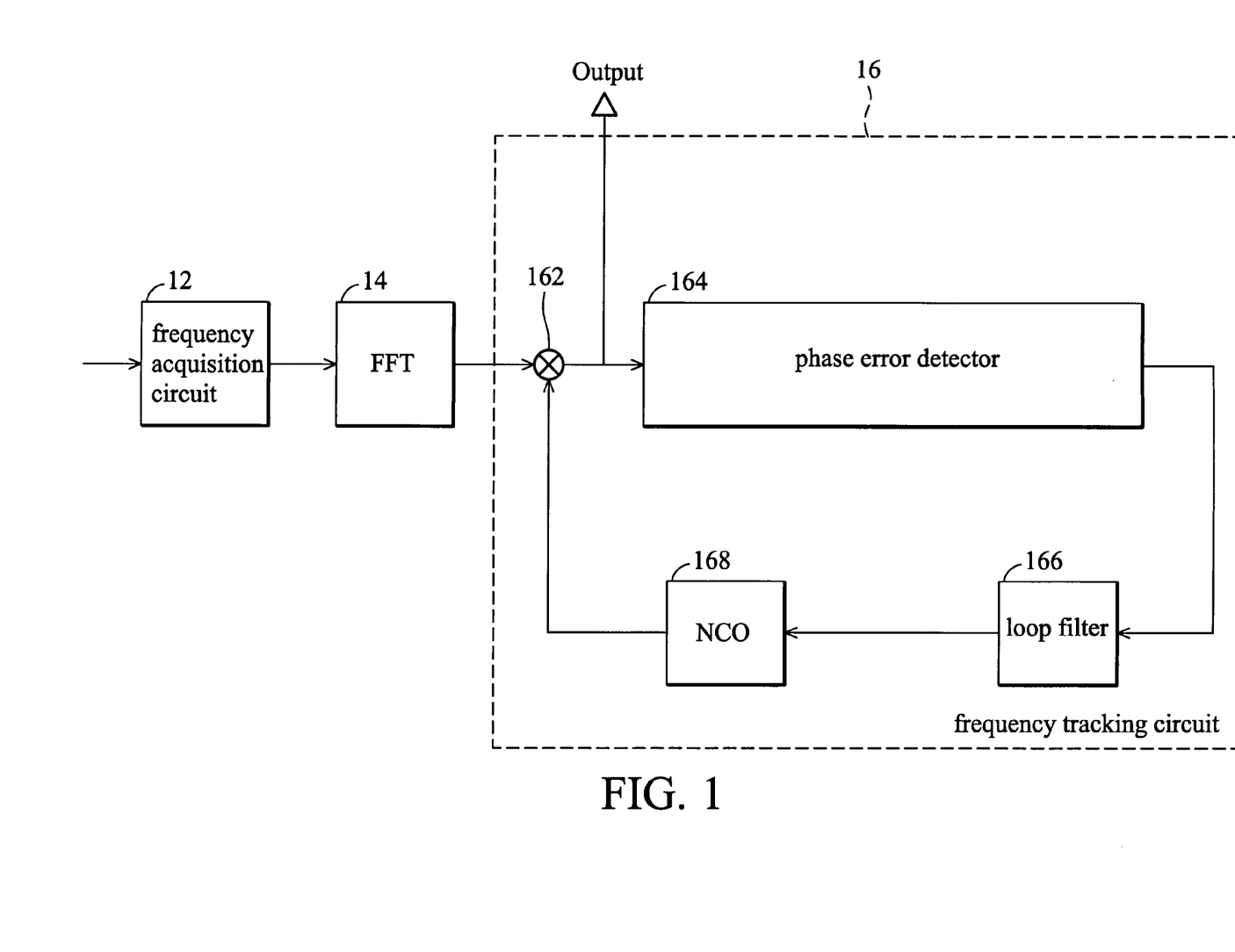
FIG. 1 is a schematic view showing a conventional phase compensation circuit.

FIG. 1 illustrates a conventional phase compensation circuit comprising frequency acquisition circuit 12, FFT (Fast Fourier Transform) circuit 14 and frequency tracking circuit 16. Frequency tracking circuit 16 comprises multiplier 162, phase error detector 164, loop filter 166 and NCO (numerical controlled oscillator) 168.

Figure 2:
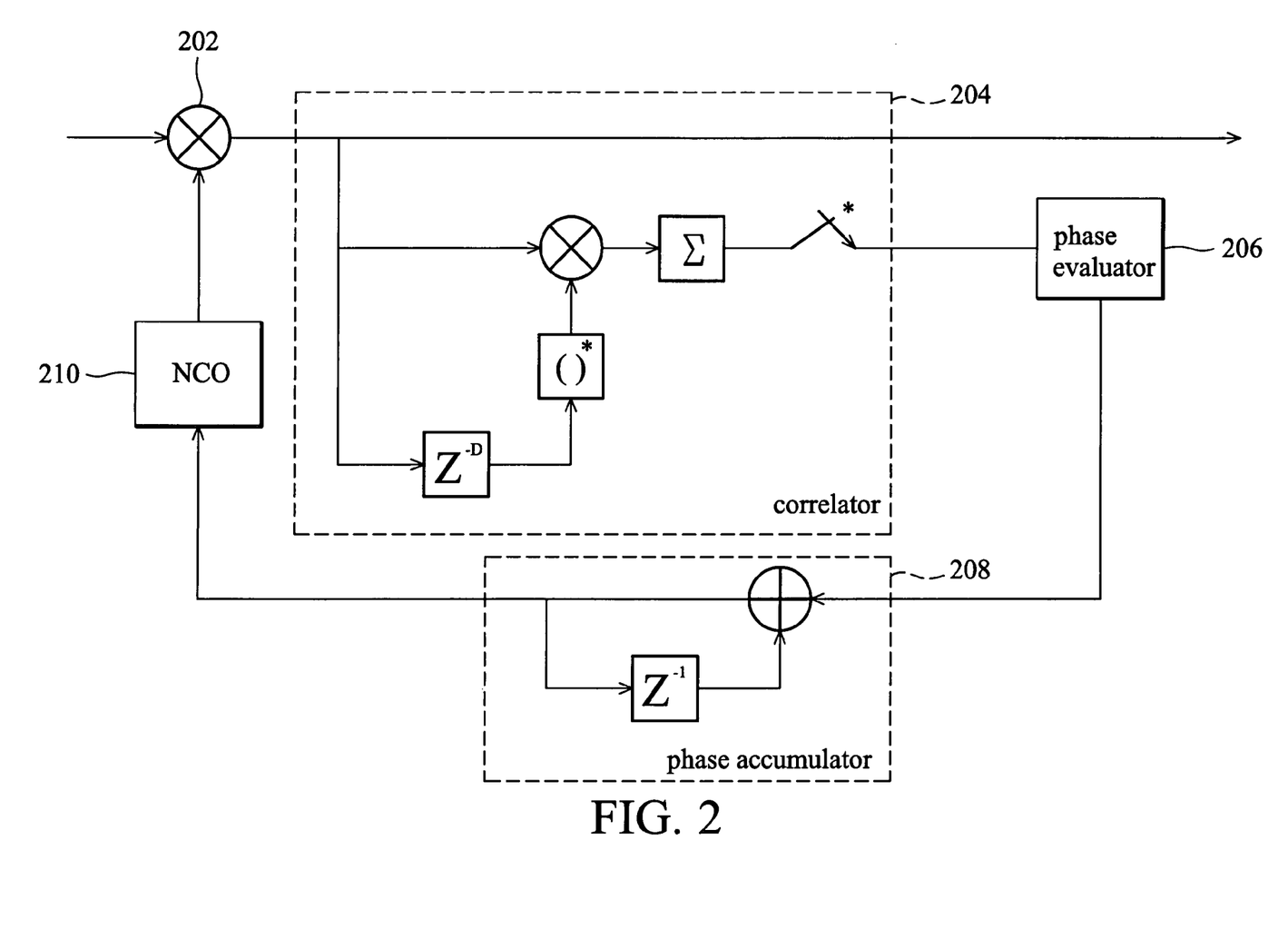
FIG. 2 is a schematic view showing a conventional frequency acquisition circuit.

FIG. 2 is a schematic view showing a conventional frequency acquisition circuit 12. Frequency acquisition circuit 12 comprises multiplier 202, correlator 204, phase evaluator 206, phase accumulator 208 and NCO (numerical controlled oscillator) 210.

In frequency acquisition circuit 12, correlator 204 generates a conjugate value according to two symbols with the same preamble. A first phase angle signal is generated by phase evaluator 206 according to the conjugate value and the symbol length, wherein the first phase angle signal is calculated by a CORDIC circuit. A first accumulated phase angle is generated by phase accumulator 208 by the way of accumulating the first phase angle signals of different symbols. A first phase compensation signal is generated by NCO 210 through searching the lookup table according to the first accumulated phase angle. An initial compensation signal is generated by multiplier 202 by compensating a received signal according to the first phase compensation signal.

Then, FFT circuit 14 performs the fast Fourier transformation on the initial compensation signal and generates a first signal and the first signal is transferred to the frequency tracking circuit 16.

In frequency tracking circuit 16, a second phase angle signal is generated by phase error detector 164 according to the first signal, wherein the second phase angle signal is calculated by the CORDIC circuit. The second phase angle signal is the phase difference between two adjacent symbols. The equation is as follows:

$$e_f(n) = \sum_k \text{phase}(X_{n,k}) - \sum_k \text{phase}(X_{n-1,k})$$

wherein n is the index of the symbol, k is the index of the pilot in the symbol, phase is a function used to calculate the phase of the pilot. Then, the high frequency part of the second phase angle signal is filtered by loop filter 166. The transfer function of loop filter 166 can be $$F(z) = C_1 + \frac{C_2}{1 - Z^{-1}},$$

wherein two parameters $C_1$ and $C_2$ can be used to determine the bandwidth and the convergence rate of frequency tracking circuit 16. NCO 168 is composed of a phase accumulator and a sin/cosine lookup table, wherein a second accumulated phase angle is generated by the phase accumulator by accumulating the second phase angle signals of different filtered symbols and a second phase compensation signal is generated by looking up the lookup table according to the second accumulated phase angle. The transfer function of NCO 168 can be $$N(z) = \frac{K_0 z^{-1}}{1 - z^{-1}},$$

wherein $K_0$ is constant gain. Finally, an output signal Output is generated by multiplier 162 through compensating the first signal according to the second phase compensation signal.

Frequency acquisition circuit 12 and phase error detector 164 of frequency tracking circuit 16 is the core of the phase compensation circuit. However, the performance may be affected by the phase evaluation algorithm used in conventional phase compensation circuit. The high hardware complexity of the CORDIC circuit used to calculate the phase angle may increase the hardware cost and may further increase the power consumption. Therefore, an algorithm with low hardware complexity is desired to calculate the phase angle to lower the power consumption of the circuit.

BRIEF SUMMARY OF INVENTION

A detailed description is given in the following embodiments with reference to the accompanying drawings.

A frequency acquisition circuit for compensating a frequency offset of a received signal comprising a multiplier, a correlator, a phase evaluator, a phase accumulator and an oscillator. A multiplier compensates the received signal according to a phase compensation signal to generate a first compensation signal, wherein the first compensation signal comprises a preamble and a plurality of symbols, each symbol having symbol length. A correlator generates a conjugate value according to the adjacent symbols of the first compensation signal. A phase evaluator generates a phase angle through a COSTAS circuit according to a real part and an imaginary part of the conjugate value and generates a phase angle signal according to the phase angle and the symbol length. A phase accumulator accumulates the phase angle signals of different symbols to generate an accumulated phase angle signal. An oscillator generates the phase compensation signal through searching the lookup table according to the accumulated phase angle signal.

A frequency tracking circuit for compensating a frequency offset of a received signal comprises a multiplier, a phase error detector and an oscillator. A multiplier compensates the received signal according to a phase compensation signal to generate an output signal, wherein the output signal comprises a first symbol and a second symbol in turn and the first symbol and the second symbol comprise a plurality of pilot signals respectively. A phase error detector comprises a phase evaluation circuit and a first phase accumulator. A phase evaluation circuit generates a first phase angle through a COSTAS circuit according to the pilot signals; and a first phase accumulator accumulates the first phase angle of the pilot signals corresponding to the first symbol to generate a first accumulated phase angle, accumulates the first phase angle of the pilot signals corresponding to the second symbol to generate a second accumulated phase angle, and generates a second phase angle according to the first accumulated phase angle and the second accumulated phase angle. An oscillator comprises a second phase accumulator for accumulating the second phase angle of the first symbol and the second symbol to generate a third accumulated phase angle signal, and generates the phase compensation signal by searching a lookup table according to the third accumulated phase angle signal.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
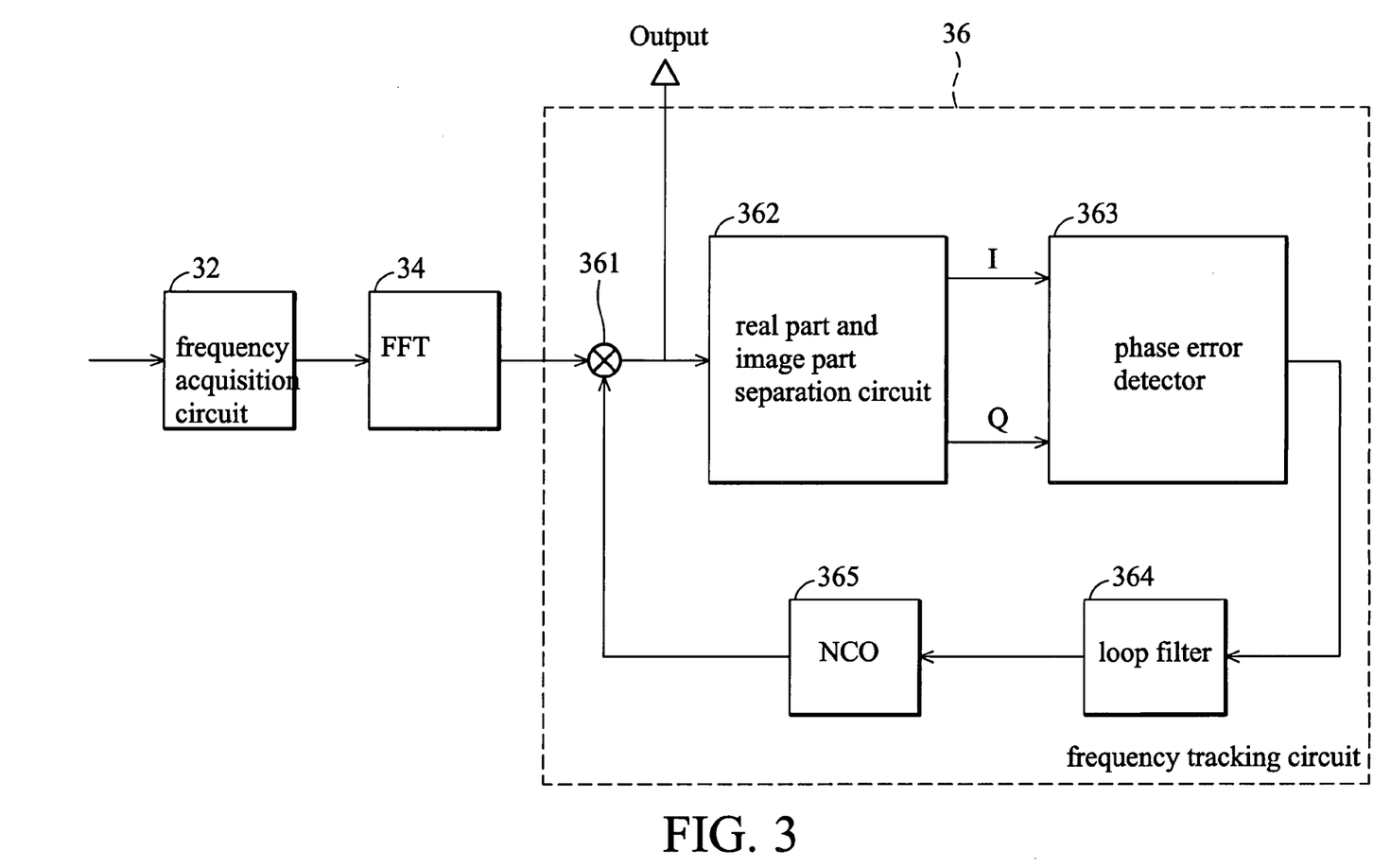
FIG. 3 is a schematic view showing an embodiment of a phase compensation circuit.

FIG. 3 illustrates an embodiment of phase compensation circuit comprising frequency acquisition circuit 32, FFT (Fast Fourier Transform) circuit and frequency tracking circuit 36. Frequency tracking circuit 36 comprises multiplier 361, real part and imaginary part separation circuit 362, phase error detector 363, loop filer 364 and NCO (Numerical Controlled Oscillator) 365.

Figure 4:
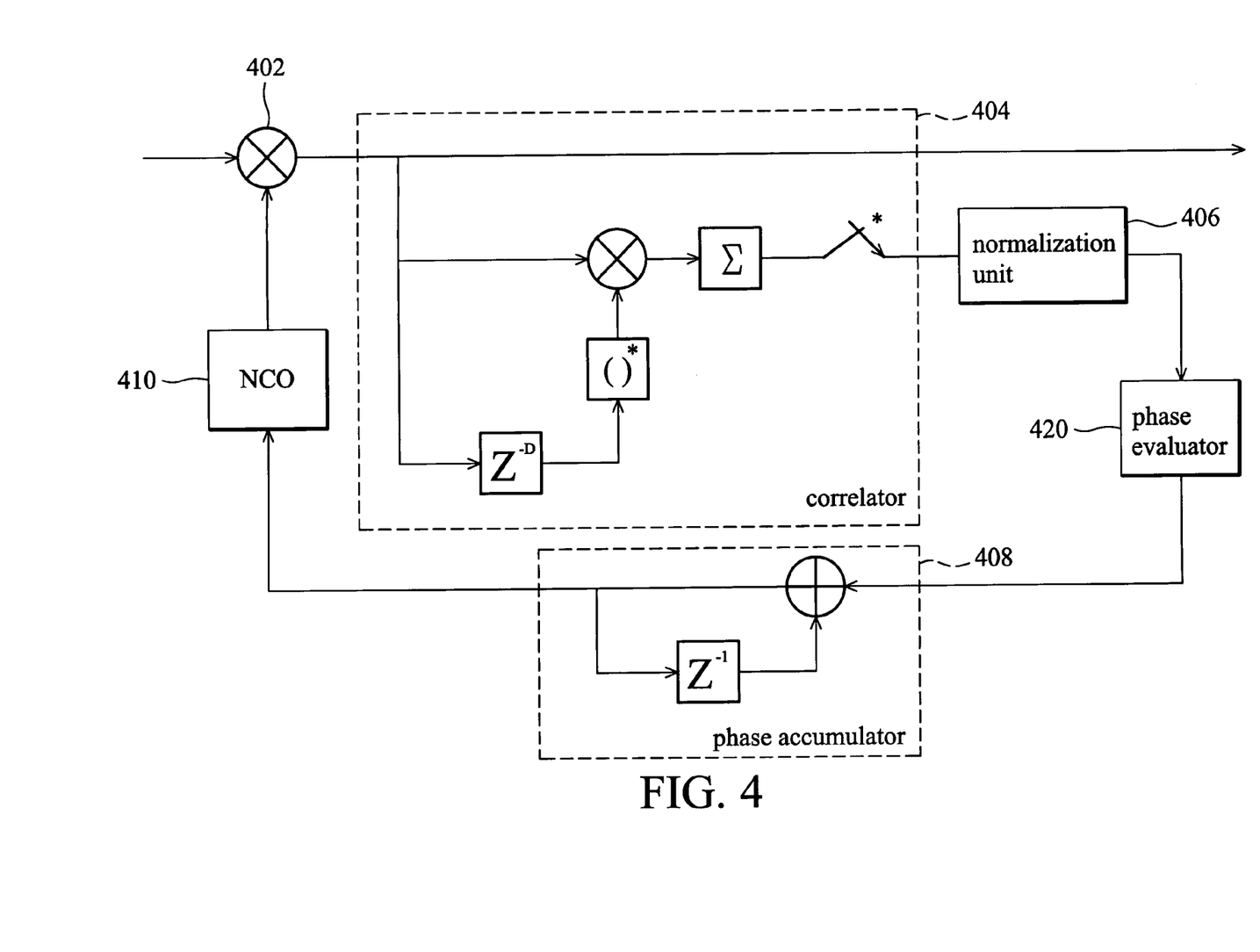
FIG. 4 is a schematic view showing another embodiment of a frequency acquisition circuit.

FIG. 4 illustrates a schematic diagram of frequency acquisition circuit 32. Frequency acquisition circuit 32 comprises multiplier 402, correlator 404, normalization unit 406, phase evaluator 420, phase accumulator 408 and NCO 410.

In frequency acquisition circuit 32, a conjugate value is generated by correlator 404 according to two symbols with the same preamble. The conjugate value is normalized by normalization unit 406. θ is generated by phase evaluator 420 according to the normalized conjugate value and a first phase angle signal is generated through dividing θ by the symbol length, wherein θ is calculated by the COSTAS circuit.

Assume the normalized conjugate value is I+jQ. When max(|I|,|Q|)/2<min(|I|,|Q|), the angle of the conjugate value is between $$\frac{3\pi}{8} \text{ and } \frac{\pi}{8}.$$

Thus, the angle θ between the conjugate value and $$\frac{\pi}{4}$$

must be calculated to lock the received signal at about 45 degree. The equation to calculate θ is Q×Sign(I)−I×Sign(Q)/√2. When max(|I|,|Q|)/2≧min(|I|,|Q|) and |I|>|Q|, the angle of the conjugate value is between 0 and $$\frac{\pi}{8}.$$

Thus, the angle θ between the conjugate value and $$\frac{\pi}{2}$$

must be calculated to lock the received signal at about 90 degrees. The equation for calculating θ is I×Sign(Q). When max(|I|,|Q|)/2≧min(|I|,|Q|) and |I|<|Q|, the angle of the conjugate value is between $$\frac{\pi}{2} \text{ and } \frac{3\pi}{8}.$$

Thus, the angle θ between the conjugate value and 0 must be calculated to lock the received signal at about 0 degrees. The equation to calculate θ is Q×Sign(I). Note that Sign(I) and Sign(Q) are functions to generate the polarity of I and Q.

Then, a first accumulated phase angle is generated by phase accumulator 408 through accumulating the first phase angle signals of different symbols. A first phase compensation signal is generated by NCO 410 through searching the lookup table according to the first accumulated phase angle. An initial compensation signal is generated by multiplier 402 through compensating received signal according to the first phase compensation signal.

Then, a first signal is generated by FFT circuit 34 through performing fast Fourier transformation on the initial compensation signal and transferring the first signal to frequency tracking circuit 36.

In frequency tracking circuit 36, real part and imaginary part separation circuit 362 retrieves each pilot signal in the first signal, separates the pilot signal into the real part I and the imaginary part Q and outputs the real part I and imaginary part Q. The type of COSTAS circuit used to calculate the phase angle is determined by phase error detector 363 according to the constellation of the pilot signal of the first signal. The COSTAS circuit comprises phase evaluator 510, 520 and 530 and phase accumulator 550. The phase difference between the pilot signal and the ideal signal is calculated by the COSTAS circuit according to the real part I and the imaginary part Q. A symbol phase difference is calculated by phase accumulator 550 through accumulating the phase difference of each pilot signal in one symbol. Then, a second phase angle signal is calculated by subtracting the symbol phase difference of the previous symbol stored in a delay unit T from the symbol phase difference. Therefore, the second phase angle signal is the phase difference between two adjacent symbols.

Figure 5A:
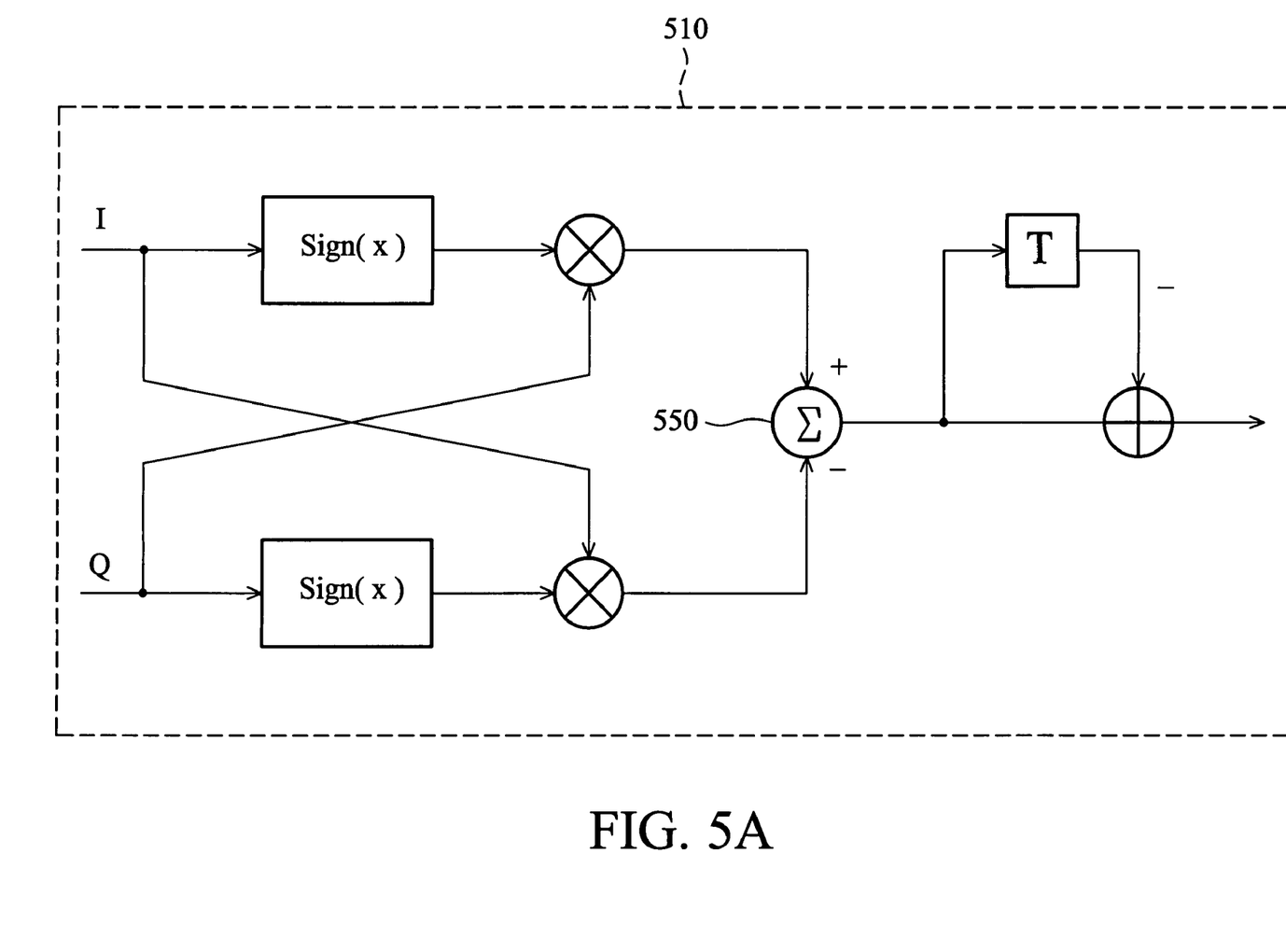
FIG. 5A is the circuit used by the phase error detector when the coordinates of the pilot signal on the constellation are $$\left(\frac{1}{\sqrt{2}}, \frac{1}{\sqrt{2}}\right), \left(-\frac{1}{\sqrt{2}}, \frac{1}{\sqrt{2}}\right), \left(-\frac{1}{\sqrt{2}}, -\frac{1}{\sqrt{2}}\right), \left(\frac{1}{\sqrt{2}}, -\frac{1}{\sqrt{2}}\right).$$

FIG. 5A illustrates the COSTAS circuit used by phase error detector 363 when the coordinates of the pilot signal on the constellation are $$\left(\frac{1}{\sqrt{2}}, \frac{1}{\sqrt{2}}\right), \left(-\frac{1}{\sqrt{2}}, \frac{1}{\sqrt{2}}\right), \left(-\frac{1}{\sqrt{2}}, -\frac{1}{\sqrt{2}}\right), \left(\frac{1}{\sqrt{2}}, -\frac{1}{\sqrt{2}}\right).$$

In this embodiment, the phase difference between the pilot signal and the ideal signal is calculated according to Q×Sign(I)−I×Sign(Q).

Figure 5B:
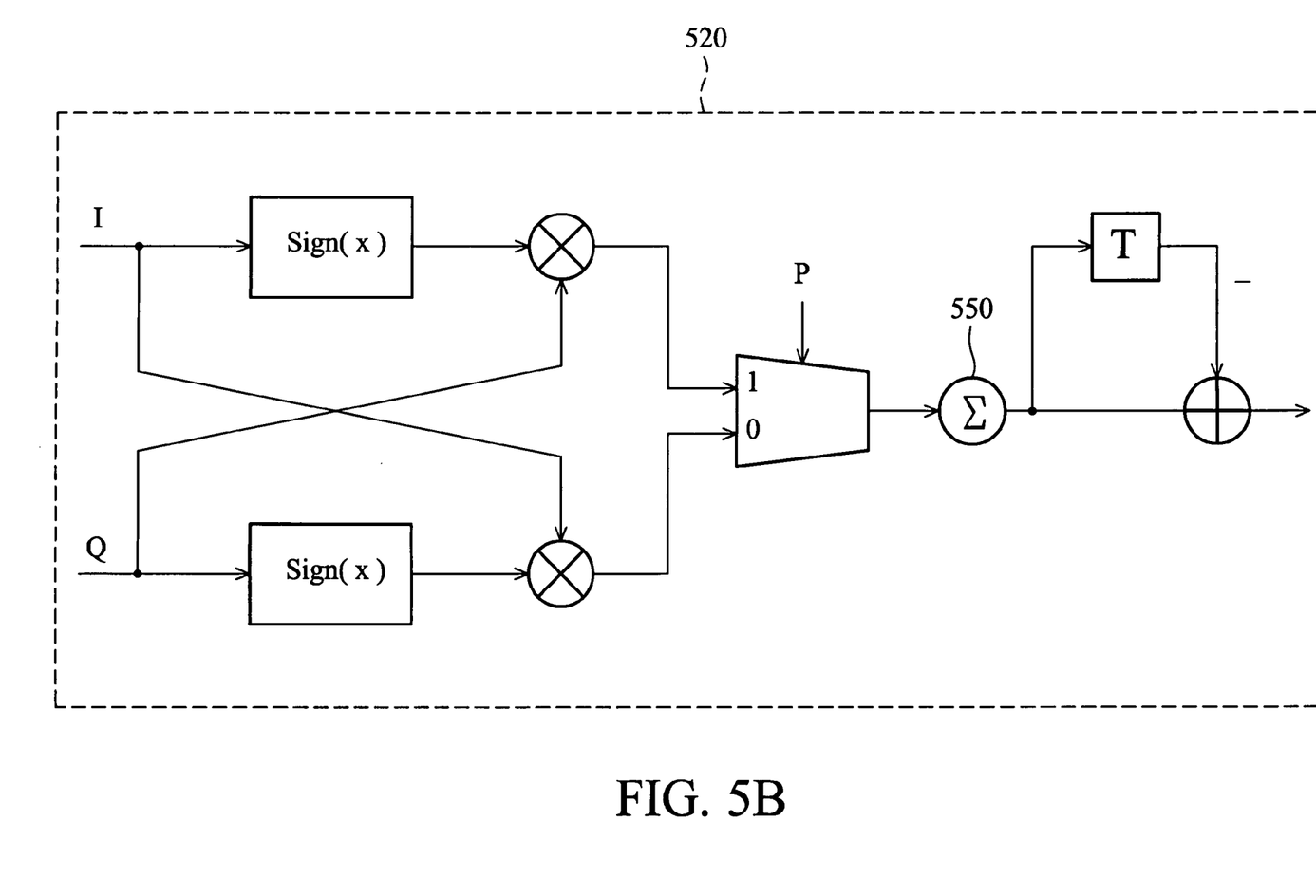
FIG. 5B is the circuit used by the phase error detector when the coordinates of the pilot signal on the constellation are (0,1),(0,−1) or (1,0),(−1,0).

FIG. 5B illustrates the COSTAS circuit used by phase error detector 363 when the coordinates of the pilot signal on the constellation are (0,1), (0,−1) or(1,0),(−1,0). In this embodiment, the phase difference between the pilot signal and the ideal signal is calculated according to Q×Sign(I) when the coordinates of the pilot signal on the constellation are (0,1), (0,−1) (P=0), while the phase difference between the pilot signal and the ideal signal is calculated according to I×Sign(Q) when the coordinates of the pilot signal on the constellation are (1,0),(−1,0) (P=1).

Figure 5C:
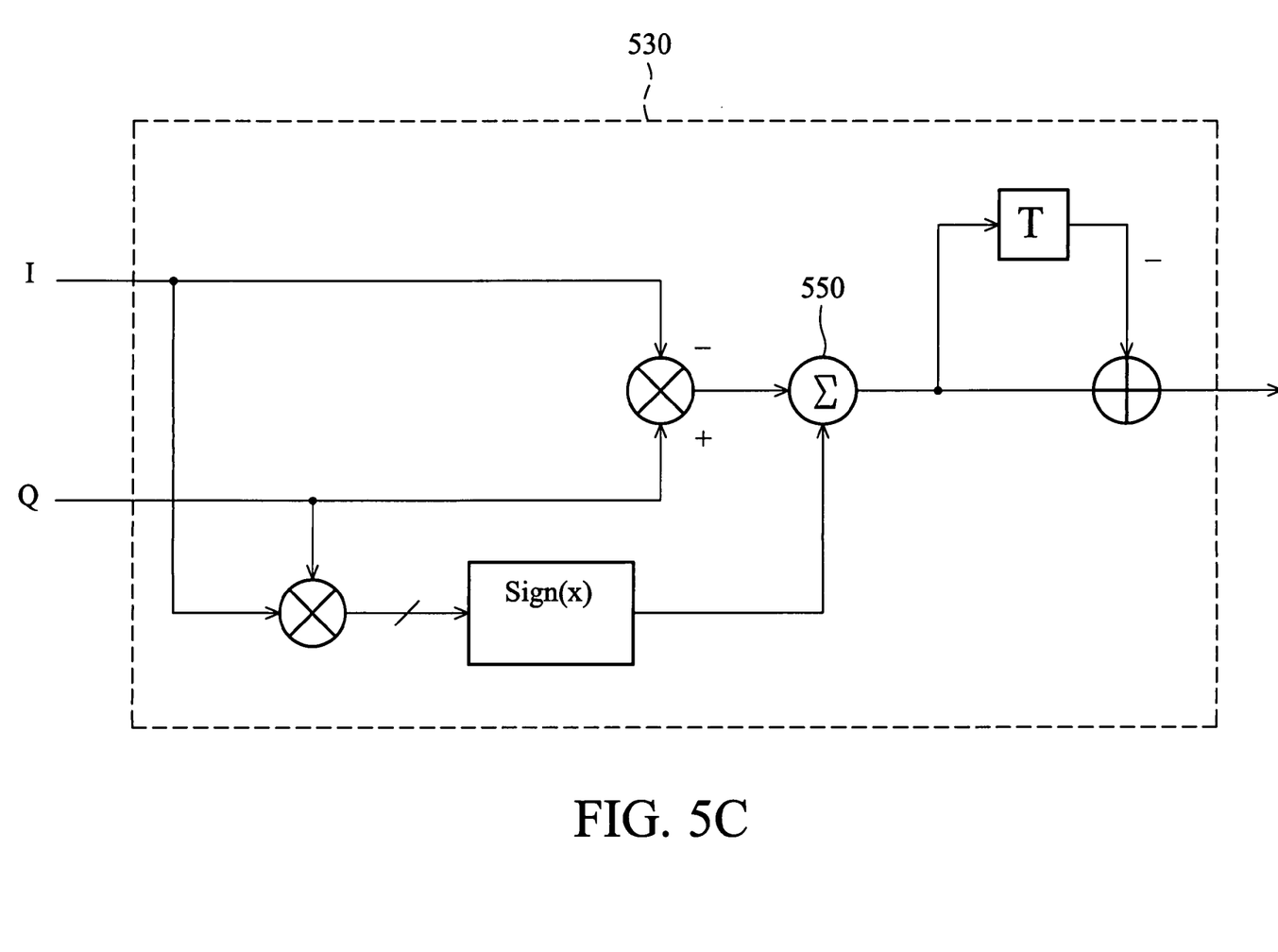
FIG. 5C is the circuit used by the phase error detector when the coordinates of the pilot signal on the constellation are $$\left(\frac{1}{\sqrt{2}}, \frac{1}{\sqrt{2}}\right), \left(-\frac{1}{\sqrt{2}}, -\frac{1}{\sqrt{2}}\right).$$

FIG. 5C illustrates the COSTAS circuit used by phase error detector 363 when the coordinates of the pilot signal on the constellation are $$\left(\frac{1}{\sqrt{2}}, \frac{1}{\sqrt{2}}\right), \left(-\frac{1}{\sqrt{2}}, -\frac{1}{\sqrt{2}}\right).$$

In this embodiment, the phase difference between the pilot signal and the ideal signal is calculated according to (Q−I)×Sign(I+Q).

Note that Sign(I), Sign(Q) and Sign(I+Q) are the functions for calculating the polarity of I, Q and I+Q respectively.

Then, the high frequency part of the second phase angle signal is filtered by loop filter 364. The transfer function of loop filter 364 can be $$F(z) = C_1 + \frac{C_2}{1 - Z^{-1}},$$

wherein the two parameters $C_1$ and $C_2$ are used to determine the bandwidth and the convergence rate of frequency tracking circuit 36. NCO 365 is composed of phase accumulator and sin/cosine lookup table, wherein the phase accumulator generates a second accumulated phase angle through accumulating the second phase angle signals of different filtered symbols and the second accumulated phase angle is used to search the lookup table and generate a second phase compensation signal. The transfer function of NCO 365 can be $$N(z) = \frac{K_0 z^{-1}}{1 - z^{-1}},$$

wherein $K_0$ is constant gain. Finally, the output signal Output is generated by multiplier 361 through compensating the first signal according to the second phase compensation signal. The compensated output signal Output will converge at the position of the ideal signal.

In the invention, the complex phase calculation of the frequency acquisition circuit and frequency tracking circuit of the conventional phase compensation circuit can be replaced by the COSTAS loop. Using the COSTAS loop to calculate the phase angle not only obtains the same performance as the conventional circuit but also can reduce hardware complexity and power consumption.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A frequency acquisition circuit for compensating a frequency offset of a received signal, comprising:
    a multiplier compensating the received signal according to a phase compensation signal to generate a first compensation signal, wherein the first compensation signal comprises a preamble and a plurality of adjacent symbols, and each of the symbols has a symbol length;
    a correlator generating a conjugate value according to the adjacent symbols of the first compensation signal having the same preamble;
    a normalization unit for normalizing the conjugate value;
    a phase evaluator generating an angle through a COSTAS circuit according to a real part and a imaginary part of the normalized conjugate value and generating a first phase angle signal according to the angle and the symbol length;
    a phase accumulator accumulating the first phase angle signals of different symbols to generate an accumulated phase angle signal; and
    an oscillator generating the phase compensation signal by searching a lookup table according to the accumulated phase angle signal.

2. The frequency acquisition circuit as claimed in claim 1, wherein the first phase angle signal is generated through dividing the angle by the symbol length.

3. The frequency acquisition circuit as claimed in claim 1, wherein the angle is a phase difference between the normalized conjugate value and π/4 when the larger of the real part and the imaginary part of the normalized conjugate value is less than two times that of the smaller of the real part and the imaginary part of the normalized conjugate value.

4. The frequency acquisition circuit as claimed in claim 3, wherein the angle is generated according to the real part of the normalized conjugate value, the imaginary part of the normalized conjugate value and the polarity of the real part and the imaginary part of the normalized conjugate value.

5. The frequency acquisition circuit as claimed in claim 3, wherein the angle is generated according to $Q \times Sign(I) - I \times Sign(Q)/\sqrt{2}$, wherein Q is the imaginary part of the normalized conjugate value, I is the real part of the normalized conjugate value, Sign(I) is the polarity of the real part of the normalized conjugate value and Sign(Q) is the polarity of the imaginary part of the normalized conjugate value.

6. The frequency acquisition circuit as claimed in claim 1, wherein the angle is a phase difference between the normalized conjugate value and one of $\pi/2$ and 0 when the larger of the real part and the imaginary part of the normalized conjugate value is greater than or equal to two times that of the smaller of the real part of the normalized conjugate value and the imaginary part of the normalized conjugate value.

7. The frequency acquisition circuit as claimed in claim 6, wherein the angle is the phase difference between the normalized conjugate value and 0 when the real part of the normalized conjugate value is greater than the imaginary part of the normalized conjugate value.

8. The frequency acquisition circuit as claimed in claim 7, wherein the angle is generated according to the polarity of the real part of the normalized conjugate value and the imaginary part of the normalized conjugate value.

9. The frequency acquisition circuit as claimed in claim 7, wherein the angle is generated according $I \times Sign(Q)$, wherein I is the real part of the normalized conjugate value and Sign(Q) is the polarity of the imaginary part of the normalized conjugate value.

10. The frequency acquisition circuit as claimed in claim 6, wherein the angle is the phase difference between the normalized conjugate value and $\pi/2$ when the real part of the normalized conjugate value is less than the imaginary part of the normalized conjugate value.

11. The frequency acquisition circuit as claimed in claim 10, wherein the angle is generated according to the imaginary part of the normalized conjugate value and the polarity of the real part of the normalized conjugate value.

12. The frequency acquisition circuit as claimed in claim 10, wherein the angle is generated according $Q \times Sign(I)$, wherein Q is the imaginary part of the normalized conjugate value and Sign(I) is the polarity of the real part of the normalized conjugate value.

13. A frequency tracking circuit for compensating a frequency offset of a received signal, comprising:
a multiplier compensating the received signal according to a phase compensation signal to generate an output signal, wherein the output signal comprises a first symbol and a second symbol in turn and the first symbol and the second symbol comprises a plurality of pilot signals respectively;
a phase error detector, comprising:
a phase evaluation circuit generating a first phase angle through a COSTAS circuit according to the plurality of pilot signals; and
a first phase accumulator accumulating the first phase angle of the pilot signals corresponding to the first symbol to generate a first accumulated phase angle, accumulating the first phase angle of the pilot signals corresponding to the second symbol to generate a second accumulated phase angle, and generating a second phase angle according to the first accumulated phase angle and the second accumulated phase angle; and an oscillator comprising a second phase accumulator for accumulating the second phase angle to generate a third accumulated phase angle signal, and generating the phase compensation signal by looking up a lookup table according to the third accumulated phase angle signal.

14. The frequency tracking circuit as claimed in claim 13, wherein the second phase angle is the difference between the first accumulated phase angle and the second accumulated phase angle.

15. The frequency tracking circuit as claimed in claim 13 further comprising a loop filter for filtering a high frequency part of the second phase angle.

16. The frequency tracking circuit as claimed in claim 13, wherein the first phase angle is a phase difference between the pilot signals and an ideal signal.

17. The frequency tracking circuit as claimed in claim 13 further comprising a real part and imaginary part separation circuit for retrieving the plurality of pilot signals of the output signal and for separating the plurality of pilot signals into a real part signal and an imaginary part signal.

18. The frequency tracking circuit as claimed in claim 17, wherein the first phase angle is generated according to the real part signal, the imaginary part signal and the polarity of the real part signal and the imaginary part signal when the coordinates of the pilot signal are $$\left(\frac{1}{\sqrt{2}}, \frac{1}{\sqrt{2}}\right), \left(\frac{1}{\sqrt{2}}, -\frac{1}{\sqrt{2}}\right), \left(-\frac{1}{\sqrt{2}}, -\frac{1}{\sqrt{2}}\right), \left(-\frac{1}{\sqrt{2}}, \frac{1}{\sqrt{2}}\right).$$

19. The frequency tracking circuit as claimed in claim 18, wherein the first phase angle is generated according to $Q \times Sign(I) - I \times Sign(Q)$, wherein I is the real part signal, Q is the imaginary part signal and Sign(I) and Sign(Q) are functions to generate the polarity of I and Q respectively.

20. The frequency tracking circuit as claimed in claim 17, wherein the first phase angle is generated according to the imaginary part signal and the polarity of the real part signal when the coordinates of the pilot signal are (0,1),(0,−1).

21. The frequency tracking circuit as claimed in claim 20, wherein the first phase angle is generated according $Q \times Sign(I)$, wherein Q is the imaginary part and Sign(I) is the function to generate the polarity of I.

22. The frequency tracking circuit as claimed in claim 17, wherein the first phase angle is generated according to the real part signal and the polarity of the imaginary part signal when the coordinates of the pilot signal are (−1,0),(−1,0).

23. The frequency tracking circuit as claimed in claim 22, wherein the first phase angle is generated according to $I \times Sign(Q)$, wherein I is the real part signal and Sign(Q) is the function to generate the polarity of Q.

24. The frequency tracking circuit as claimed in claim 17, wherein the first phase angle is generated according to the real part signal, the imaginary part signal and the polarity of the real part signal and the imaginary part signal when the coordinates of the pilot signal are $$\left(\frac{1}{\sqrt{2}}, \frac{1}{\sqrt{2}}\right), \left(-\frac{1}{\sqrt{2}}, -\frac{1}{\sqrt{2}}\right).$$

25. The frequency tracking circuit as claimed in claim 24, wherein the first phase angle is generated according to $(Q-I) \times$ Sign(I+Q) wherein I is the real part signal, Q is the imaginary part signal and Sing(I+Q) is the function to generate the polarity of I+Q.

26. The frequency tracking circuit as claimed, in claim 13, wherein the first accumulated phase angle is stored in a delay unit of the phase accumulator.

27. The frequency tracking circuit as claimed in claim 13, wherein the transfer function of the oscillator is $$N(z) = \frac{K_0 z^{-1}}{1 - z^{-1}},$$

wherein Z is the filtered second phase angle and K0 is the constant gain.

* * * * *